United States Patent [19]

Boros

[11] 4,280,633
[45] Jul. 28, 1981

[54] SAFETY WARNING DEVICE FOR IGNITION SWITCH

[76] Inventor: Stephan A. Boros, Box 61, Grand Rivers, Ky. 42045

[21] Appl. No.: 968,721

[22] Filed: Dec. 12, 1978

[51] Int. Cl.³ .............................................. H02G 3/14
[52] U.S. Cl. ..................................... 220/241; 114/211
[58] Field of Search .................. 174/66, 67; 200/293, 200/302, 304; 339/36, 44 R, 10; 220/241, 242; 114/211

[56] References Cited

U.S. PATENT DOCUMENTS

| | | | |
|---|---|---|---|
| 1,807,344 | 5/1931 | Roth . | |
| 3,140,344 | 7/1964 | Slater | 174/67 |
| 3,204,807 | 9/1965 | Ramsing | 220/242 |
| 3,564,744 | 2/1971 | Shook | 40/125 |
| 3,716,815 | 2/1973 | Riches | 174/67 |
| 3,948,202 | 4/1976 | Yoshikawa . | |
| 3,951,091 | 4/1976 | Doench . | |
| 4,078,691 | 3/1978 | Mesh | 174/67 |

Primary Examiner—Trygve M. Blix
Assistant Examiner—D. W. Keen
Attorney, Agent, or Firm—Lowe, King, Price & Becker

[57] ABSTRACT

A safety warning device for an ignition switch comprises a cup-shaped base member which is conveniently secured around the ignition switch and a cup-shaped cover member pivotally attached to the base member which is normally held in a closed position to preclude access to the ignition switch. A safety message is conspicuously displayed on the outer and inner faces of the cover member to warn an operator of necessary precautions to take prior to actuation of the ignition switch. The cup-shaped base and cover members also provide a weather-tight seal when closed to protect the ignition switch against contamination.

3 Claims, 5 Drawing Figures

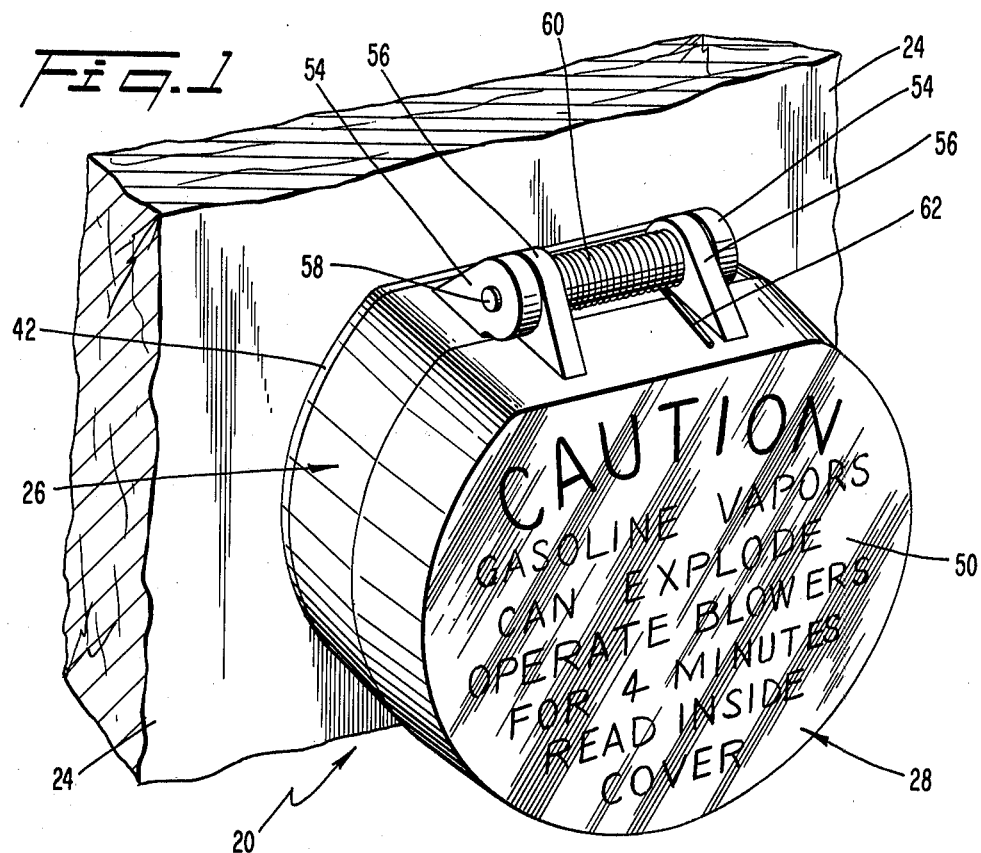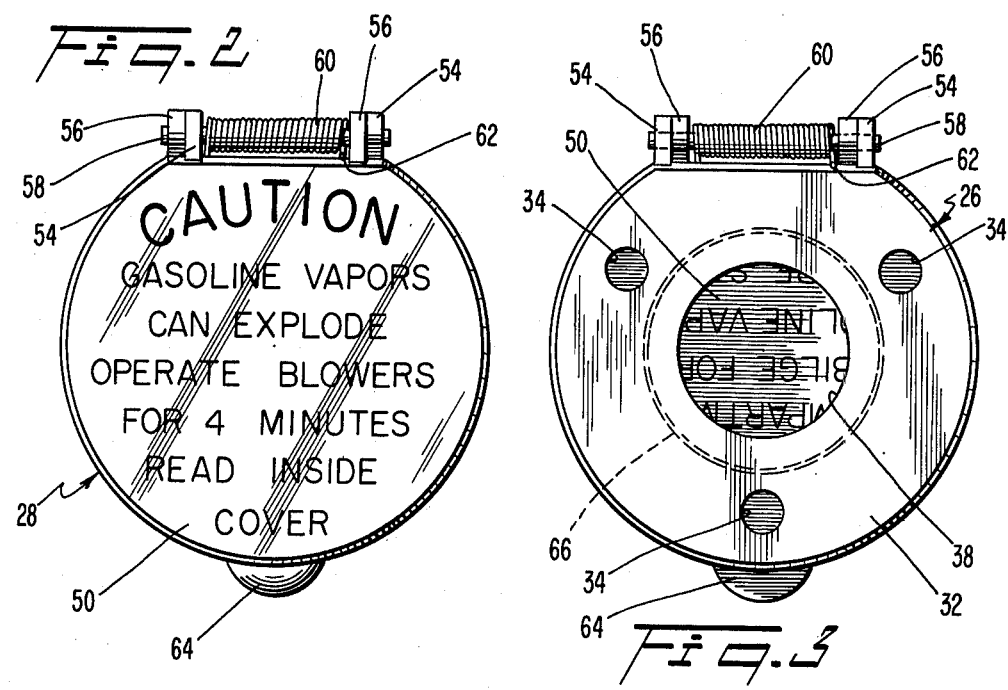

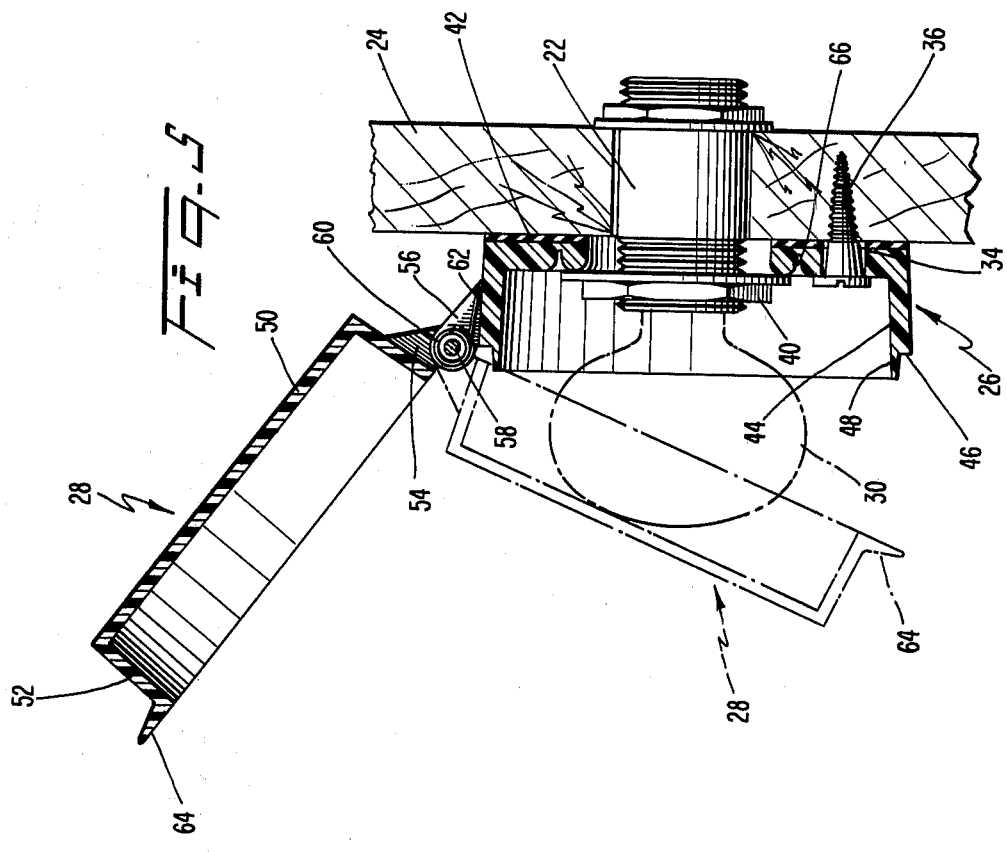
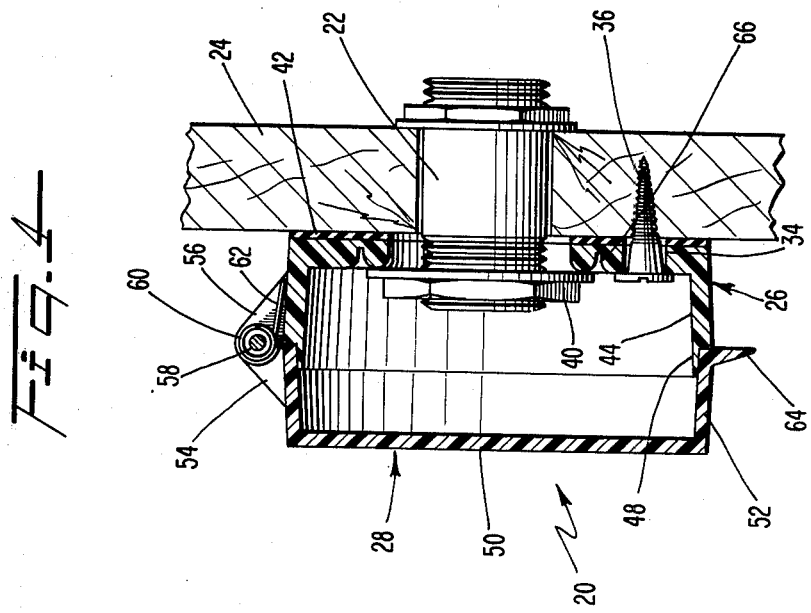

SAFETY WARNING DEVICE FOR IGNITION SWITCH

TECHNICAL FIELD

The present invention relates to a safety device for an ignition switch and, more particularly, to a safety warning device and protective cover which can be readily installed on the control panel of a boat. The device displays a safety message to warn an operator of certain precautions which should be taken prior to actuation of the ignition system. The safety warning device is especially suitable for use with key-operated boat ignition systems but is also applicable to other key-operated or pushbutton operated ignition switch systems.

BACKGROUND ART

The operation of boats with inboard engines presents significant danger of explosions unless specific safety precautions are taken prior to starting the engines. For example, in the case of a boat with its engine located under the hull, gasoline fumes can build up within the hull when the boat is not in operation. Typically, the boat is provided with blowers which can be operated to remove the gasoline fumes from inside the inboard hull. If the blowers are not operated prior to starting the engine, the boat is a potential bomb which can be triggered by small sparks generated when the ignition system is actuated.

The danger of an explosion is increased where inexperienced operators or children are allowed to operate boats. Moreover, even the most experienced boater can be occasionally distracted and forget to turn on the blowers prior to actuation of the ignition system. Thus, a safety device which warns the operator of the need to turn the blowers on, can serve as a reminder to both experienced and inexperienced boaters and avoid dangerous explosions.

Prior art safety ignition devices for boats have principally concerned the incorporation of a time delay or protective circuit in the ignition system which prevents starting of the engine before the blowers have been run for a predetermined amount of time. See, for example, U.S. Pat. Nos. 2,526,446, 3,948,202 and 3,951,091. However, these proposals have been generally expensive to utilize because of the need for costly electrical components. Moreover, the prior art devices have been difficult to install on existing ignition systems. Consequently, there is a need for an inexpensive safety warning device for a boat ignition switch which is inexpensive and convenient to install.

In addition, protective cover devices have been previously proposed for installations such as automobile ignition switches, doorbell switches and other electric pushbuttons. See, for example, U.S. Pat. Nos. 3,564,744, 1,807,344, 2,447,226 and 1,801,228. However, none is suitable to fulfill the requirements of a boat ignition system where it is desirable not only to display a warning message to the operator, but also to protect the ignition switch against contamination, such as rust and corrosion.

Accordingly, it is a primary object of the present invention to provide a safety warning device for an ignition switch which is simple in design and convenient to install on all types of boats.

Another object of the invention is to provide a safety warning device which conspicuously displays a warning message to remind the boat operator to turn on the blowers prior to actuation of the ignition switch to start the boat engine.

It is also an object of the invention to provide a safety warning protective device comprising a base member adapted to be secured to the surface on which the ignition switch is mounted and a cover member pivotally attached to the base member which is normally held closed to preclude access to the ignition switch.

A further object of the invention is to provide a safety warning device wherein the base member and cover member are adapted to provide a protective seal around the ignition switch against contamination.

It is a further object of the invention to provide a safety warning device which is readily adapted for use with ignition switches of different sizes.

DISCLOSURE OF INVENTION

The present invention provides a safety warning device for an ignition switch which comprises a base member adapted to be secured around the ignition switch and a cover member pivotally attached to the base member and movable between a closed position to preclude access to the ignition switch and protect it against contamination and an open position to allow access to the ignition switch. The base member has an opening formed therein to receive the ignition switch and an upstanding peripheral rim, while the cover member has an edge portion adapted to engage the peripheral rim of the base member with the cover member in its closed position. The cover member is normally held in its closed position to preclude access to the ignition switch and display a warning message on the face of the cover member.

Preferably, a portion of the base member around the opening is adapted to be removed to enlarge the opening and accommodate a larger size ignition switch. A gasket member may be provided on the base member for engaging the surface on which the ignition switch is mounted to provide a seal around the ignition switch. In addition, a bias spring may be provided for normally urging the cover member toward its closed position with its edge portion in engagement with the peripheral rim of the base member.

In a preferred embodiment, the base and cover members are cup-shaped in configuration and adapted to mate with the cover member in its closed position to provide a weather-tight seal therebetween. Preferably, the peripheral rim of the base member is adapted to fit inside and engage the edge portion of the cup-shaped cover member to protect the ignition switch against contamination. For additional safety, warning messages may be provided on the opposite faces of the cover member to be selectively displayed with the cover member in its closed or open position.

The safety warning device of the present invention is especially suitable for key-operated boat ignition systems to warn an operator to turn on the blowers prior to starting the engine. In addition, it is equally applicable to other ignition switch systems, e.g., key-operated automobile ignition switches, and systems which utilize pushbutton operated ignition switches.

BRIEF DESCRIPTION OF DRAWINGS

The accompanying drawings illustrate a preferred embodiment of the present invention and, together with the description, serve to explain the principles and operation of the invention.

FIG. 1 is an enlarged, perspective view illustrating a safety warning device embodying the present invention installed on a control panel of a boat;

FIG. 2 is a front view of a cover member which forms part of the safety warning device;

FIG. 3 is a rear view of a base member which forms part of the safety warning device;

FIG. 4 is a vertical cross section of the safety warning device with its cover member held closed; and FIG. 5 is a vertical cross section of the safety warning device with its cover member open.

DETAILED DESCRIPTION OF PREFERRED EMBODIMENT

Referring to FIG. 1, a safety warning device, generally 20, for an ignition switch 22 mounted on a control panel 24, comprises a cup-shaped base member 26 adapted to be secured to the control panel around the ignition switch and a cup-shaped cover member 28 pivotally attached to the base member. Both cover members 26, 28 are preferably formed of inexpensive plastic, such as injection molded polyethylene or polypropylene. Cover member 28 is movable between a closed position (FIG. 4) which precludes access to the ignition switch and an open position (FIG. 5) which allows access to the ignition switch for insertion of a key 30.

As shown in FIGS. 3 and 4, base member 26 includes a flat, annular base portion 32 provided with a set of equidistantly spaced screw holes 34 for receiving screws 36 to fasten the base member to control panel 24. Base member 26 also includes an enlarged circular opening 38 formed at the center of its base portion 32 to receive ignition switch 22. Preferably, base portion 32 is clamped against control panel 24 by a nut 40 threadably mounted on ignition switch 22. An annular gasket 42 may be provided on the rear surface of flat base 32 to provide a weather-tight seal between the safety warning device and control panel to protect ignition switch 22 against contamination.

In addition, as shown in FIG. 5, base member 26 includes an upstanding peripheral rim 44 provided with an annular ledge 46 and an outer lip portion 48 adapted to fit inside cover member 28 in its closed position to protect the ignition switch against contamination. Cover member 28 includes a flat cover portion 50 and an upstanding edge portion 52 adapted to mate with peripheral rim 44 of base member 26. With the cover member closed (FIG. 4), the rim of peripheral edge portion 52 engages annular ledge 46 of base member 26. In addition, outer lip portion 48 of base member 26 fits inside and engages edge portion 52 of cover member 28 to provide a weather-tight seal and protect ignition switch 22 against contamination.

Cover member 28 is pivotally attached to base member 26 by a hinge-like coupling comprising a pair of flanges 54 provided on the base member and a pair of hinged members 56 provided on the cover member which are pivotally connected by a stainless steel pin 58 (FIG. 1). A stainless steel spring 60 is mounted on pin 58 and provided with a pair of spring arms 62 (FIGS. 2 and 3) which engage the base and cover members to normally bias cover member 28 toward its closed position. A lip 64 is provided on cover member 28 to facilitate manual opening of the cover member.

A warning message is provided on the front face of cover member 28 to warn an operator to take certain precautions prior to actuation of the ignition switch. For example, in the case of an ignition switch system for a boat having an inboard engine, the following safety message may be provided on the outer face of the cover member:

CAUTION

TURN BLOWER ON

FOR AT LEAST FIVE

MINUTES BEFORE

STARTING ENGINE

Preferably, this message is provided on the outer face of cover member 28 by raised letters integrally formed on the cover member. To enhance the visibility of the warning message, the letters may be made a contrasting color to the cover member. In addition, the same safety message may be formed on the inner face of cover member 28 for display when the cover member is moved to its open position.

In the preferred embodiment, base member 26 includes a portion around central opening 38 which is adapted to be removed to enlarge the opening to accommodate ignition switches of different sizes. As shown in FIGS. 3 and 4, a circular indentation 66 is formed on the inner surface of flat base portion 32 to provide a weakened annular portion surrounding opening 38 which can be readily punched out with a knife or other cutting tool to enlarge the opening.

To install safety warning device 20 on ignition control panel 24, clamping nut 40 is unthreaded from ignition switch 22 and base member 26 is placed on the control panel with the ignition switch projecting into its central opening 38. If necessary, the weakened portion defined by circular indentation 66 is punched out or broken away to enlarge the opening to receive the ignition switch. Next, a set of holes is drilled in control panel 24 in alignment with screw holes 34 provided in the base member. Screws 36 are then inserted into the holes and tightened to fasten base member 26 to the control panel. Clamping nut 40 is re-threaded onto ignition switch 22 to further clamp base member 26 against control panel 24. Annular rubber gasket 42 provides a weather-tight seal between the base member and control panel.

Cover member 28 is normally held in its closed position (FIG. 4) by stainless steel bias spring 60. With the cover in its closed position, tapered outer lip portion 48 of peripheral rim 44 (see FIGS. 4 and 5) of the base member fits snugly inside oppositely tapered edge portion 52 of the cover member which engages annular ledge 46 to provide a weather-tight seal to protect the ignition switch against contamination. The safety message on the outer face of cover member 28 is conspicuously displayed to warn the operator to turn the blowers on before starting the engine. When it is desired to actuate the ignition switch, cover member 28 is pivoted upward by grasping lip 64 and key 30 is inserted into the ignition switch. The warning message on the inner face of cover member 28 again reminds the operator to turn on the blowers before starting the engine.

The invention provides a safety warning device for an ignition switch which is simple in design and convenient to install on both new and old ignition systems. The safety warning device is advantageously designed to display a conspicuous safety message on both sides of its cover member to warn an operator of necessary safety precautions to take prior to actuating the ignition switch. In addition, the safety warning device provides a weather-tight seal to protect the ignition switch against contamination.

The present invention is not limited to specific details shown and described, and modifications may be made in the safety warning device without departing from the principles of the invention. For example, various shapes, depths, heights, diameters and written messages may be made without departing from the principles I have identified.

I claim:

1. A safety warning device for an ignition switch mounted on a control panel, comprising:

a cup-shaped base member having a flat base portion adapted to be secured to the control panel on which the ignition switch is mounted, said base portion having an enlarged opening formed therein to receive the ignition switch and an upstanding peripheral rim raised substantially above said ignition switch to protect said switch, said peripheral rim of said base member includes an outer lip portion adapted to fit inside and engage said edge portion of said cover member to protect the ignition switch against contamination;

a cup-shaped cover member having a flat cover portion and an edge portion adapted to engage said peripheral rim of said base portion, said outer lip portion and said edge portion are oppositely tapered around the periphery to mate and to enhance the sealing function;

hinge means pivotally connecting said base and cover members together to allow said cover member to be pivoted from a closed position with its edge portion engaging said peripheral rim of said base member to an open position allowing access to the ignition switch;

means for normally holding said cover member in its closed position to preclude access to the ignition switch and provide protection against contamination, said holding means comprises a constantly operable bias spring for normally urging said cover member toward its closed position; and warning means provided on said cover member for display when said cover member is in its closed position, said warning means is formed on the outside and inside faces of said cover member to be selectively displayed with said cover member in its closed or open position.

2. The safety warning device of claim 1, wherein:

said base member includes a break-away portion around said opening adapted to be removed to enlarge said opening.

3. The safety warning device of claim 2, wherein:

said break-away portion includes an indentation formed in said base member around said opening to provide a weakened portion which can be easily broken away to enlarge said opening.

* * * * *